Le R. GATES.
Moth-Traps for Bee-Hives.

No. 136,911.  Patented March 18, 1873.

UNITED STATES PATENT OFFICE.

LEROY GATES, OF PLEASANT HILL, MISSOURI.

IMPROVEMENT IN MOTH-TRAPS FOR BEE-HIVES.

Specification forming part of Letters Patent No. 136,911, dated March 18, 1873.

*To all whom it may concern:*

Be it known that I, LEROY GATES, of Pleasant Hill, in the county of Cass and State of Missouri, have invented a new and useful Improvement in Bee-Hives, of which the following is a specification:

My invention consists, mainly, in a new construction of moth box or trap, as hereinafter described.

Figure 1:
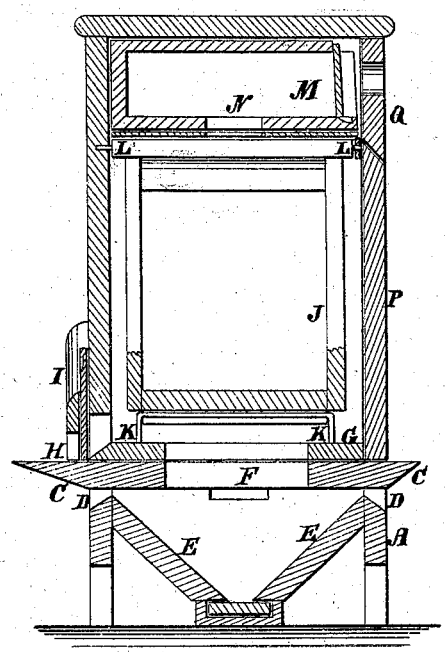
Figure 2:
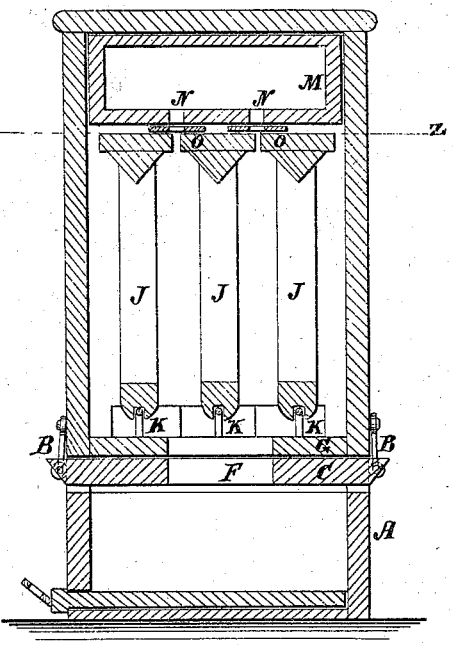
Figure 3:
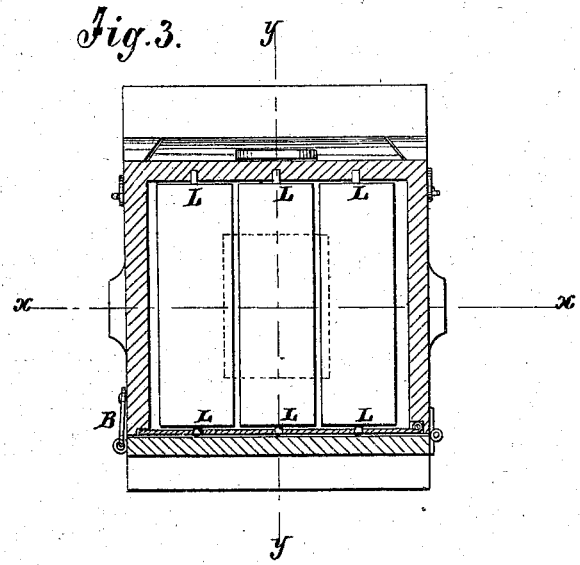

In the drawing, Figure 1 represents a vertical section of the hive taken on the line $x\ x$ of Fig. 3. Fig. 2 is a vertical section taken on the line $y\ y$ of Fig. 3. Fig. 3 is a horizontal section taken on the line $z\ z$ of Fig. 2.

Similar letters of reference indicate corresponding parts.

A is the base, which is attached to the brood-chamber by the hooks B. C is the top of the moth-trap, which forms the lighting-ing shelf or platform for the bees, directly beneath which are the moth-entrances D D. E E are inclined planes, down which the moth slide to the center, which center is provided with a removable pan containing water or other liquid, or a slide, or both, by means of which the moth are destroyed. F is an orifice through the top C. The comb-cuttings from the brood-chamber pass down through this orifice into the moth-trap. G is the bottom of the brood-chamber, which has an orifice of similar size covered with wire-gauze, to prevent millers reaching the upper chamber of the hive. H is the bee-entrance, provided with a sliding shutter, I. J represents the comb-frames, which stand vertical, and slide in from the rear on the raised wires K. Each frame has a groove in its bottom to receive the wire, as seen in the drawing. The top of each of the frames has a projecting wire, L, at each end. At one end the wire enters the front of the hive, as seen in Fig. 1; at the other end it receives a hinged strap of iron, which is perforated for each wire. The frames are held in a vertical position by this means. M represents the honey-box, one or more of which may be used. The bees find access to this box between the frames, and through orifices N N in the boxes. Between the tops of the frames and the boxes are strips of iron O O, with apertures to correspond with the orifices in the box, as seen in Fig. 2. P represents the door at the back of the hive, which allows the frames to be withdrawn. Q is a door above P, which allows the honey-box to be withdrawn. R is a ventilating-orifice, covered with wire-gauze.

I am aware it is not new to provide an entrance to a moth box or trap directly beneath the alighting-board, and do not, therefore, claim such an arrangement; but What I do claim, is—

An improved combined moth-trap and base or support, A, for a hive, formed with vertical end walls, the inclined sides E provided with entrance-holes D, the sliding bottom drawer, and the top C having projecting beveled ends and central opening F, all constructed and arranged as specified.

LEROY GATES.

Witnesses:
J. C. HEARNE,
W. A. COOPER.